United States Patent

[11] 3,604,830

[72] Inventor James H. Frakes
 Tucson, Ariz.
[21] Appl. No. 880,332
[22] Filed Nov. 26, 1969
[45] Patented Sept. 14, 1971
[73] Assignee Westinghouse Electric Corporation
 Pittsburgh, Pa.
 Continuation-in-part of application Ser. No. 685,216, Nov. 22, 1967, now abandoned, which is a continuation of application Ser. No. 543,706, Apr. 19, 1966, now abandoned.

[54] SPACE AND TEMPERATURE ACCOMMODATING SELF-CLEANING WEATHER CASING AND HIGH VOLTAGE INSULATING STRUCTURE EMPLOYING THE SAME
 11 Claims, 9 Drawing Figs.
[52] U.S. Cl. ........................... 174/31 R,
 174/143, 174/152 R, 174/211
[51] Int. Cl. ............................ H01b 17/26
[50] Field of Search ........................ 174/12.3,
 18, 19, 30, 31, 31.5, 73, 74, 74.1, 75, 75 D, 76,
 77.1, 80, 139, 142, 143, 152, 153, 209, 211, 212,
 77

[56] References Cited
 UNITED STATES PATENTS
2,269,076 1/1942 Boll ........................ 174/77.1 X
3,242,446 3/1966 Leute ...................... 174/152 X
3,257,501 6/1966 Sauer ..................... 174/143
3,301,938 1/1967 Frey ....................... 174/31
3,315,026 4/1967 Gregory .................. 174/139
 FOREIGN PATENTS
 889,835 10/1943 France .................... 174/142
1,124,650 7/1956 France .................... 174/152
1,046,171 12/1958 Germany ................. 174/152
1,056,223 4/1959 Germany ................. 174/73
1,189,600 3/1965 Germany ................. 174/143
 248,621 5/1926 Italy ....................... 174/152

Primary Examiner—Laramie E. Askin
Attorneys—A. T. Stratton, C. L. McHale and M. I. Hull ABSTRACT: A weather casing has axially spaced sheds extending equal distances from the body portion of the casing, or sheds near one end thereof which extend from the body portion graduated increasing distances as the end is approached, to encase insulating bodies including bushings of tapering outside diameters as well as outside diameters uniform over the length to be covered, and enhance washoff of the lower sheds for either type bushing body. The casings are cemented or clamped at the ends. No gaskets are required. Oil may fill a substantial space between a casing composed of resilient or elastic material and the bushing body, the casing by its resiliency or elasticity accommodating expansion or contraction of the oil due to ambient temperature changes and other causes. The body of the casing and/or the sheds may be so flexible that wind moves the sheds, breaking ice and throwing off snow. Where a filler material is added between casing and body of insulation, the elastic casing keeps the filler material under pressure at all times.

PATENTED SEP 14 1971

TOWARD REMOTE END OF CONDUCTOR STUD

TOWARD GROUND SLEEVE

SPACE AND TEMPERATURE ACCOMMODATING SELF-CLEANING WEATHER CASING AND HIGH VOLTAGE INSULATING STRUCTURE EMPLOYING THE SAME

CROSS-REFERENCE TO RELATED APPLICATIONS

This application is a continuation-in-part of copending application Ser. No. 685,216, filed Nov. 22, 1967, which is a continuation of application Ser. No. 543,706, filed Apr. 19, 1966, both now abandoned, both of said applications being assigned to the assignee of the instant invention.

BACKGROUND OF THE INVENTION

1. Field of the Invention

The invention relates to bushings and weather casings, to the solution of prior art problems involving cleaning, sealing against moisture, shocks resulting from mechanical impact, or intense magnetic field shock resulting from short circuit current of short duration before a circuit breaker opens, expansion and contraction with temperature changes, gas generated within a bushing structure, corona within and without the bushing, leakage resistance and voltage flashover, the removal of snow and ice, and replacing a weather casing in the field.

2. Description of the Prior Art

Bushings for outdoor use, having sheds on the main body of the bushing, or sheds on a casing or other structure enclosing the main body portion of the bushing, although of ancient origin in the electrical art, have frequently represented a conglomeration of comprises by the designer, in which cost, dimensions, life expectancy, voltage flashover, creepage resistance, cleaning properties, ease of replacement, in the field, and other factors, have been one or more of the design considerations, with the designer sacrificing one to achieve another, or sacrificing two or more, or all, to produce a bushing in which no design or operating parameter was optimized. Prior art efforts are exemplified by U.S. Pat. No. 2,269,076; No. 3,192,312; No. 3,242,446; No. 3,257,501 and others, and foreign patents including French Pat. No. 1,124,650 to Alsthom; Italian Pat. No. 248,621 to Titus; German printed application 1,056,223 to Herbert; and German printed application 1,189,600 to Leeds.

In prior art bushings which are used outdoors, it has been the conventional practice to enclose the bushing in a weather casing. Conventional bushings have used a ceramic porcelain weather casing over the end of the bushing exposed to the weather. Generally speaking, considerable care is necessary to seal the porcelain casing at each end to prevent moisture from entering the bushing and causing electrical failure. Also, an appreciable volume of filling is required to fill the space between the porcelain and the bushing insulation. Generally there are wide tolerances in the manufacture of porcelains, and close clearances between the inside diameter of the porcelain and the outside diameter of the bushing insulation cannot be obtained.

Further, it has been general practice to use a metal expansion cap to provide gas space and permit a filler to expand and not increase the pressure to a high value inside the bushing. The large diameter of the metal cap also requires greater spacing between bushings on circuit breakers and transformers to meet specified metal-to-metal electrical clearances.

Furthermore, considerable parts are needed to seal the porcelain casing to the bushing. An example of this is seen in an excellent prior art bushing such as that described in Westinghouse Electric Corporation catalog I.L. 33–354–2 dated May, 1956. In the partially sectional view thereof it is seen that the porcelain is solder sealed to the bushing. This is obtained by first painting a band of platinum around the circumference at each end of the porcelain and firing it to the porcelain. The platinum film is then tinned and metal parts soldered to the porcelain. The porcelain casing with the metal parts are then soldered to the bushing. This requires careful workmanship and pressure tests between different operations to ensure that the porcelain is not cracked or damaged.

A further type of excellent prior art bushing is shown in the catalog of the Westinghouse Electric Corporation page I.L. 354–1 wherein FIG. 6, which is partially in section, shows another means by which the porcelain is sealed to a bushing. The ends of the porcelain are ground smooth and parallel. Gaskets are used between the ends of and throw porcelain and metal parts. Spring pressure located in the cap is used to maintain continuous pressure on the gaskets and prevent leaks due to expansion and contraction of the bushing parts.

However, in service the porcelain becomes contaminated as a result of surrounding atmospheric conditions and requires periodic cleaning or else electrical flashover may occur. It is difficult and expensive to get apparatus out of service and to clean. Some power companies use silicone grease smeared over the surface of the porcelain to prolong cleaning periods and prevent electrical flashovers. The use of silicone grease on a surface exposed to weather is expensive and requires replacing every 6 to 12 months.

Furthermore, porcelain has the disadvantage that it will break under a mechanical blow or strain and due to thermal shock. When a porcelain casing is damaged it is necessary to remove the bushing from the apparatus and send it to the shop for repair.

If electrical failure occurs in the filling or the bushing insulation, a high-pressure gas is generally built up inside of the porcelain which causes it to burst and throw sections of porcelain great distances. This can cause considerable damage.

SUMMARY OF THE INVENTION

My invention overcomes these and other disadvantages of the prior art. In one embodiment, I provide a weather casing composed of flexible insulating material such as butyl rubber, which can be processed to have a wide range of characteristics varying from that approaching rigidity to very great flexibility. Whereas butyl rubber is a suitable material, the invention is not limited thereto; other materials which have the necessary electrical resistance, which can be made in varying degrees of resiliency or elasticity as required by the embodiments of my invention, can be found in current Handbooks on Electrical Engineering or current Handbooks of Physics and Chemistry. This flexible casing or "flexible sock" has an inside shape and inside dimensions which are generally of the same dimensions and shape as the outside of the rigid bushing body, so that the flexible weather casing can be slid over the bushing, and after the flexible casing, which has sheds formed thereon on the outside surface thereof, has been moved into place over the outside surface of the bushing body with the end of the weather casing adjacent the ground resilient and extending at least a predetermined distance over the ground sleeve, a clamp for securing the last-named end of the weather casing to the ground sleeve is applied. The other or outer end of the weather casing is clamped to the lead conductor or conductor stud, or to the end of the casing remote from the ground sleeve. If desired, cement may be used on the inside surfaces of the weather casing which are clamped to the ground sleeve and the lead conductor, respectively, or to the remote end of the bushing body. If desired, a filler may be used between the inside surface of the weather casing and the bushing body insulation. This filler may be silicone grease, but whereas the silicone grease mentioned with respect to prior art bushings is exposed to the weather and is washed off in 6 to 12 months, the silicone grease which I may employ between casing and bushing is fully protected from the weather and may last for the life of the weather casing.

The above-described casing of my invention may have a service life of 5 to 10 years or more. It may be easily removed in service simply by loosening the end which is clamped to the ground sleeve and also removing the other clamp at the remote end and peeling the casing off the bushing, whereafter a new casing is installed without removing the bushing from its associated electrical apparatus.

In another embodiment, a very resilient or elastic weather casing encloses a substantial volume of oil between the inside surface of the wall portion of the casing and the bushing body ends of the casing are clamped to the ground sleeve and to the stud or remote end of the bushing body. As the volume occupied of rigid the oil increases with an increase in temperature, the elastic or resilient casing stretches to accommodate the increased volume; as the volume of the oil decreases with decreasing temperature, the elastic weather casing shrinks or contracts, so that at all times there is no airspace within the bushing. The absence of airspace avoids corona which would cause radio interference and which would burn the bushing insulation.

In still another embodiment, the body portion and/or sheds of the casing are so flexible that the sheds respond to and are moved by wind, breaking ice, and dislodging snow.

In other embodiments, clamps are avoided, gaskets are avoided, filler material is avoided, washoff is enhanced. At least some embodiments of the casing may be used with bushings having body portions of substantially uniform outside diameter along the length thereof. Any filler material between the inside wall of the casing and the outside wall of the bushing body is maintained under constant pressure by the casing at all times, the elastic casing being stretched before sealing and the last clamping operation.

In other embodiments, a casing is cast in a rigid or semirigid form, closely dimensioned to slide over and fit the outside surface of the bushing body without any airspace therebetween. No filler is required.

DESCRIPTION OF THE PREFERRED EMBODIMENTS

Figure 1:
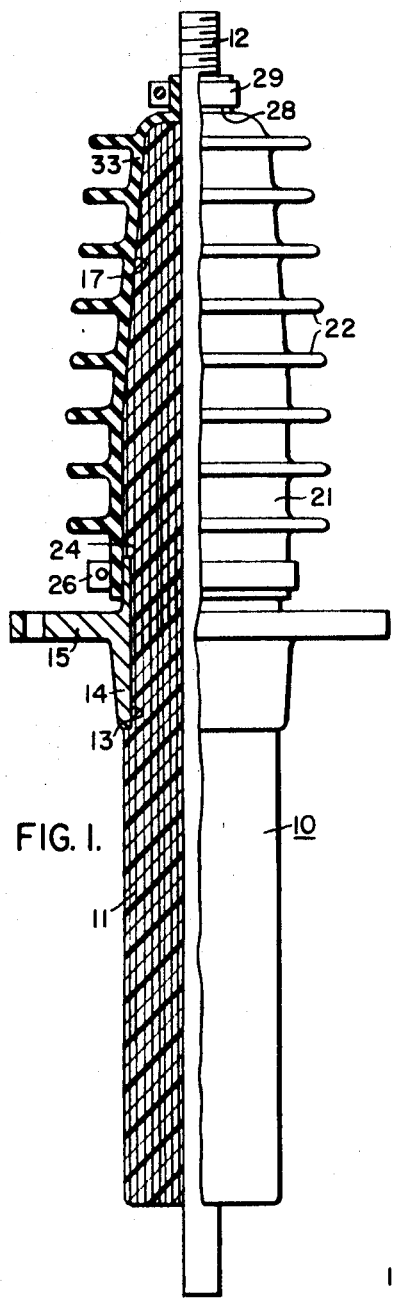
FIG. 1 is a view of a bushing and weather casing according to one embodiment of my invention.

Referring now to the drawing for a more detailed understanding of the invention and in particular to FIG. 1, a bushing is shown generally designated at 10, having an insulating portion 11 which may be any suitable dielectric for use in a condenser bushing, and having a conductor stud 12 passing therethrough. Disposed in annular groove 13 in the insulating portion 11 is a ground sleeve 14 having a ground flange portion 15. The upper end of the insulation portion 11 has a slightly tapering outer surface 17 provided to make the washoff from the lower sheds of the casing more effective, since in the example shown the sheds extend equal distances from the body of the casing. Disposed upon that portion of the bushing 10 which extends above the ground sleeve is a weather casing generally designated 21 composed, for example, of butyl rubber, the outer surface of the weather casing 21 having a plurality of sheds 22 formed thereon. The lower end of the weather casing 21 extends over the upper end portion 24 of the ground sleeve and may be cemented thereto by cement, not shown for convenience of illustration, and is clamped thereto by clamp 26. The upper end of the weather casing generally designated 21 has a small portion of reduced diameter 28 which snugly fits the conductor stud and is clamped thereto by clamp 29. If desired, cement, not shown, may be interposed between the inside surface of the weather casing and the conductor stud.

If desired, a filler, not shown, may be employed between the outside wall of the bushing insulation 11 and the inside surface of the weather casing, this filler being, if desired, a very thin layer of silicone grease.

It is seen then that my weather casing of FIG. 1 provides the desirable electrical characteristics of a weather casing; that is, it is composed of an electrical insulating material which has a high electrical resistance, and furthermore my weather casing has sheds which increase the leakage path, and also which may be washed by rain to tend to keep the outside of the weather casing clean. At the same time, my weather casing is flexible and may be removed from the top portion of the bushing when wear has occurred simply by, for example, grasping the weather casing at the lower end thereof after removing clamp 26 and removing the upper clamp 29 and pulling the "flexible sock" weather casing from the bushing whereafter a thin coating of fillerlike material such as silicone grease may be applied to the bushing if desired and a new weather casing applied and clamped in place and, if desired, cemented.

One of the advantages derived from a casing composed of a material such as butyl rubber is that the bushing insulation is machined to close dimensions and the butyl rubber casing can also be molded to close dimensions. In assembling the bushing and weather casing, the weather casing is pulled over the bushing insulation to a snug fit with, if desired, a thin coat of fillerlike silicone grease filling any small spaced between the two parts. The hoselike clamp is fastened around each end of the weather casing to secure it in weatherproof sealing engagement to the bushing.

My invention makes use of very simple means for assembling the weather casing to the bushing without a great number of metal parts such as sealing gaskets, springs, etc. As previously stated, the resilient and flexible casing can easily and quickly be replaced in the field, if ever necessary, without removing the bushing from the associated electrical apparatus.

No expansion space is required for the filler because the filler is only a thin film. An additional advantage derived from the use of my invention is that bushings can be mounted closer together on the apparatus, because the metal cap diameter has been appreciably decreased.

The butyl rubber casing has the advantage that it will not break under mechanical blows or strains and will not break due to thermal shock. Other materials also provide these advantages.

If electrical failure occurs in the bushing insulation, the butyl rubber will not break up, and parts of the bushing body will not fly apart for a great distance and be dangerous. Furthermore, a compound like butyl rubber has a favorable characteristic to clean itself or retain a high surface resistance when subjected to electrical stresses under contaminated conditions. This favorable characteristic can eliminate the necessity of cleaning bushings in service or prolong the period between cleanings to a great length of time. In summary, my invention of a bushing with a weather casing such as that described is easy to assemble in the factory or in the field, is inexpensive and simple in construction, eliminates or prolongs periods between cleaning bushings in service, prevents explosions that cause danger from flying parts, and is small in structure, permitting the apparatus to have overall smaller dimensions.

A thin film of filling material between weather casing and bushing body may act like a grease to assist in pulling the weather casing over the bushing, and fill any small spaces that may occur between the weather casing and the bushing body, eliminating airspaces where dangerous gas could collect.

Figure 2:
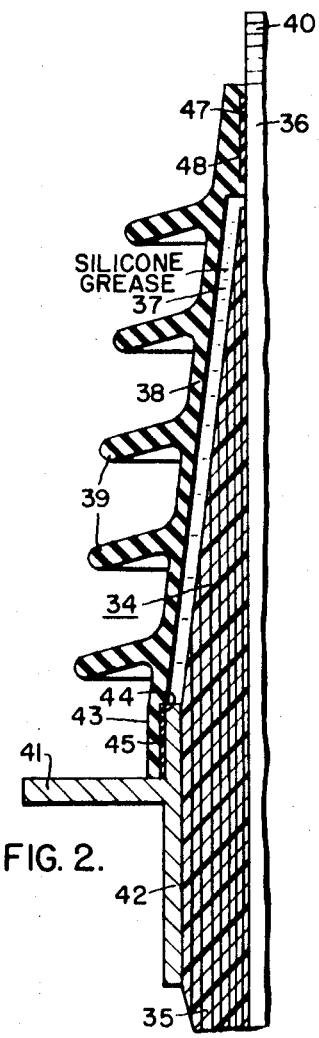
FIG. 2 is a view similar to FIG. 1 in which the function of the end clamps is performed by cement.

Particular reference is made now to FIG. 2. The bushing generally designated 34 has a body portion 35 with conductor stud 36 passing therethrough, the outside wall of the body portion 35 tapering from a relatively large outside diameter near the ground sleeve 42 to a relatively small outside diameter near the threaded end 40 of the conductor stud, with a filling 37 of silicone grease or other suitable material between the inner wall of weather casing 38 and the adjacent wall of body portion 35. Sheds 39 are shown as sloping. A suitable cement 45 binds the ground flange end 43 of the weather casing 38 to the ground sleeve, which has ground flange 41 formed integral therewith, cement 45 binding to the inner surface 44 of this portion of the weather casing. In a similar manner, at the outside or upper end of the bushing, cement 48 in the annular space 47 binds the weather casing to an unthreaded portion of the conductor stud, providing weatherproof sealing at both ends of the casing.

Figure 3:
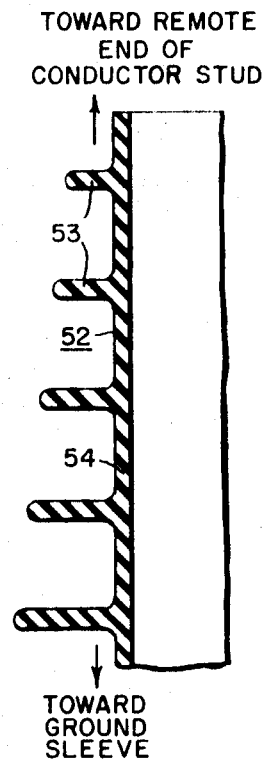
FIG. 3 is a fragmentary view of my weather casing suitable for use on a bushing body of substantially uniform outside diameter along its length, in which the lower sheds extend farther from the body of the casing to enhance washoff

Particular reference is made to FIG. 3, a bushing body not shown for convenience of illustration, having a substantially uniform outside diameter over its length, and if desired having a conductor stud passing therethrough, and further if desired being of the condenser bushing type, is disposed in the weather casing 52, casing 52 having spaced sheds 53 which extend graduated progressively increasing distances from the body portion 54 of the casing as the axial distance from the upper portion of the figure, which it is understood extends toward what will be the upper or outside end of the bushing, increases and the lower end of the figure is approached, which it is understood extends toward what will be the portion of the casing at the ground sleeve end. My invention includes a casing according to FIG. 3 clamped at both ends, one cemented at both ends, one clamped at one end and cemented at the other, one having oil or other material in a space between the inside wall of the weather casing and the rigid body portion of the bushing, according to teachings disclosed hereinafter, and one having a casing composed of material so resilient, flexible, and elastic that wind catches and moves the sheds, breaking any ice formed thereon and throwing off any snow accumulated thereon.

Figure 4:
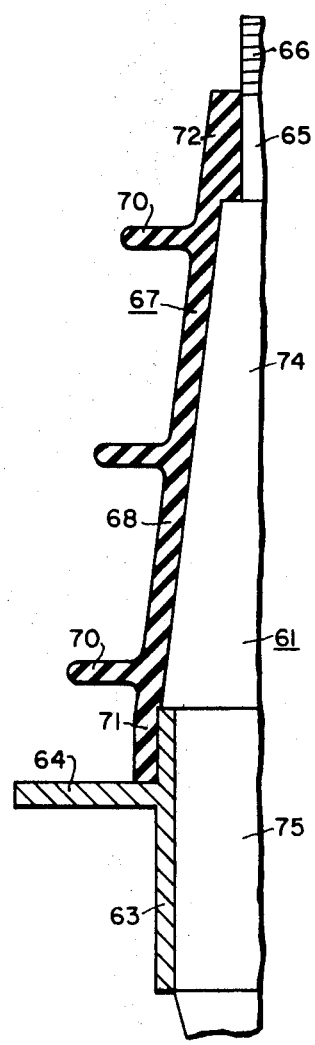
FIG. 4 is a view of a weather casing of less resiliency but carefully dimensioned to slip over a tapering bushing body and tightly press against the ground sleeve and conductor stud to provide weatherproof sealing.

Particular reference is made to FIG. 4. A bushing 61 which may be of the condenser type has a conductor stud 65 extending therethrough, the stud having threaded outer end 66. The bushing has a cylindrical body portion 75 enclosed by ground sleeve 63 which has flange 64, and a tapering portion 74 extending from the ground sleeve toward the threaded end of the conductor stud. Weather casing generally designated 67 has a body portion or wall portion 68 preformed to closely and snugly fit the rigid portion of the bushing body without, if desired, the use of any filler therebetween, inner end 71 of the weather casing being preformed to be forced over the ground sleeve and to tightly fit the same, outer end 72 of the weather casing being preformed to be forced over the conductor stud 65 and to tightly engage the same so that no sealing is necessary. The weather casing 67 has axially spaced sheds 70 at spaced intervals along the length of the wall portion 68.

Figure 5A:
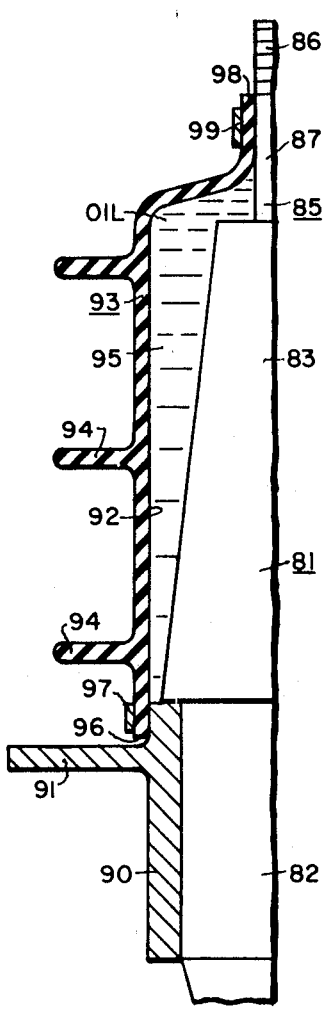
FIGS. 5a, 5b and 5c show an embodiment of my invention in which the weather casing is composed of very resilient and elastic material and encloses a substantial volume of oil or other suitable material between the inside wall of the weather casing and the outside wall of the body portion of the bushing, and in which the casing adapts itself to changes in the volume of the oil due to expansion and contraction resulting from temperature changes.
Figure 5B:
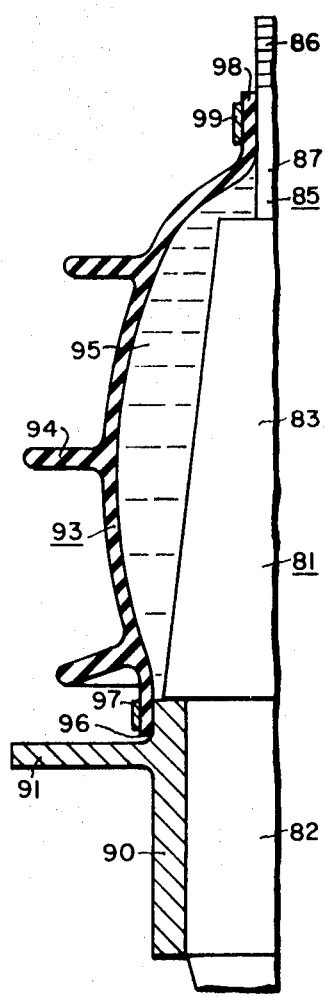
Figure 5C:
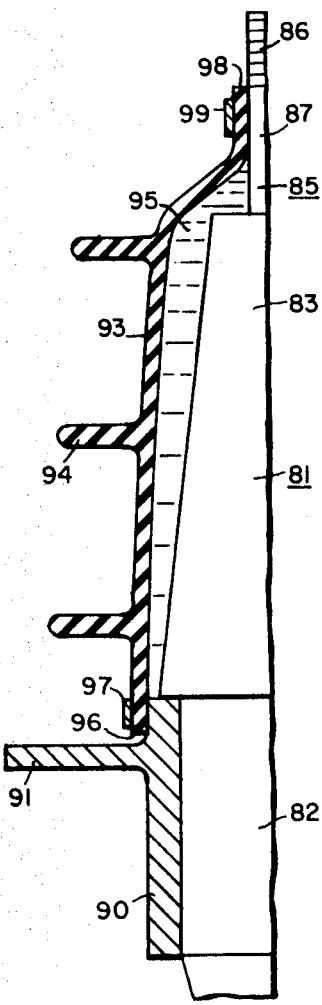

Particular reference is made to FIGS. 5a, 5b, and 5c. In FIG. 5a, bushing generally designated 81 has cylindrical body portion 82 enclosed by ground sleeve 90 which may be formed integrally with ground flange 91, and a portion 83 which tapers with diminishing outside diameter toward the threaded outer end 86 of conductor stud generally designated 85. Stud 85 has an unthreaded portion 87 which extends beyond the bushing body portion 83. Weather casing 93 composed of resilient or elastic material has an outer end 98 clamped by clamp 99 to unthreaded portion 87 of the conductor stud, and an inner end 96 clamped by clamp 97 to the ground sleeve 90, with a substantial oil-filled space or volume 95 between the inside wall surface 92 of the weather casing and the wall of the tapering body portion 83 of the bushing. It will be understood that the oil completely fills the space 95, leaving no air pocket and requiring no expansion chamber, as will be seen more clearly hereinafter. The bushing may have a condense structure if desired, not shown for convenience of illustration. The weather casing generally designated 93 has spaced sheds 94 along the length thereof.

Particular reference is made to FIG. 5b, where the volume of oil 95 is shown expanded due to a temperature rise, which may result from ambient temperature changes, or heat generated in the bushing by, for example, eddy current losses in the dielectric, heating of the stud by the electrical current passing therethrough, and other factors. The resilient or elastic weather casing 93 stretches to accommodate the increased volume of the oil, and may assume the position shown. Because weather casing ends 98 and 96 are securely clamped by clamps 99 and 97 respectively to the stud portion 87 and ground sleeve 90 respectively, the weather casing remains secured in position as the casing is stretched and enlarged to accommodate the increased volume of oil.

Particular reference is made to FIG. 5c, where the volume of oil 95 is shown reduced from that of FIG. 5a due to a fall in temperature of the oil below that assumed in FIG. 5a. Weather casing 93 contracts and may assume the position shown.

It will be understood that when the bushing is first filled with oil, sufficient oil is inserted to require some expansion of the elastic weather casing 93, to allow for contraction of the casing as the volume of oil will decline with a fall in temperature; the volume of oil inserted when the bushing is filled is limited to that which, when expanded to an anticipated limit set by operating any external conditions, can be accommodated by the elasticity of the weather casing without rupturing the same.

Figure 6:
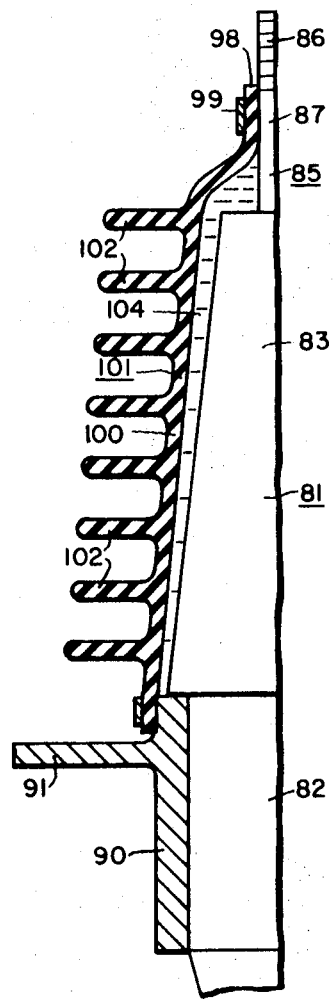
FIG. 6 shows an embodiment of my invention wherein the body portion of the weather casing and/or the sheds are so resilient that the sheds are movable by wind to break ice and throw off snow.

Particular reference is made to FIG. 6 is which an additional embodiment of the bushing and weather casing of my invention is shown, wherein the body portion 100 of the weather casing generally designated 101 is so flexible and thin that the sheds 102 are moved out of their normal positions shown as a result of force exerted thereon by wind, slant upward or downward momentarily, with the result that any ice formed thereon is broken and thrown off, and snow accumulated thereon is thrown off. This response to wind may be enhanced by having an oil-filled space 104 between the casing and the bushing body portion 83.

Summarizing the advantages of the various embodiments of my invention heretofore described, the need for a expansion chamber, which enlarges the bushing, and in which gas can accumulate, is avoided; in prior art bushings, electrical breakdown within the bushing has caused burning and sparking, building up gas the volume of which can become so great that sufficient pressure is built up to low up the bushing. The resilient weather casing prevents the buildup of pressure within the bushing due to expansion and contraction. In some embodiments no gaskets are needed and no sealing is required; gaskets have proved troublesome in the prior art. In the embodiments where the weather casing is molded to close dimensions and tightly fits the body portion of the bushing, gas is eliminated. The weather casing cushions the body of the bushing, which may be porcelain, against shocks and prevents breaking from strains, such as those resulting from the intense magnetic field resulting from a short circuit existing for a short time before a circuit breaker opens elsewhere in an electrical circuit which includes the conductor stud. Such a magnetic field has the effect of tending to separate the parts of the bushing from each other.

Embodiments of the weather casing other than that shown in FIG. 3 may have sheds which extend to graduated progressively increasing distances from the body portion of the casing.

Embodiments of the weather casing other than that shown in FiG. 2 may have sheds which slope downward from the body portion of the weather casing.

The statements made hereinabove with respect to flashover and creepage resistance of the weather casing of FIG. 1 apply also to the weather casings of the other embodiments.

It will be understood that in at least some applications, increasing the diameter of the lower sheds, by increasing their area, may decrease the creepage resistance over the surface of the bushing; for this reason, it may be desirable to have as many sheds as closely spaced as can be done while providing for washoff, and to avoid sheds of increasing outside diameter.

Whereas for simplicity of illustration, the body portion of the casing is shown in many of the various figures of the drawings of about the same thickness, it will be understood that in some embodiments, for example that of FIGS. 5a, 5b, and 5c, the casing, in order to obtain the necessary elasticity, may be thinner, and in the embodiment of FIG. 6 the casing, in order to permit dislocation of the sheds from their normal positions by wind, may be made thin, very resilient, and very flexible.

Figure 7:
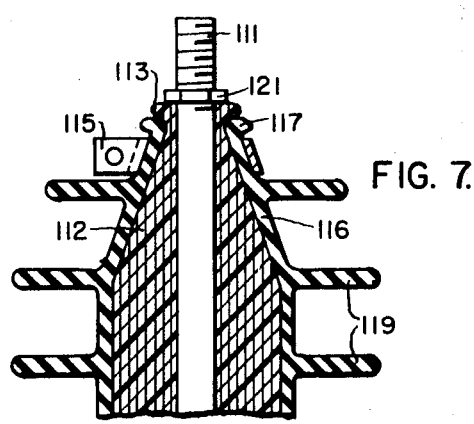
FIG. 7 shows an arrangement, applicable to many embodiments, where the outer end of the casing is clamped to the outer end of the bushing body rather than to the conductor stud.

In FIG. 7 to which particular reference is made, insulating body 112 has threaded connector 111 for attaching to a conductor embedded in one end thereof, insulating body 112 being enclosed by casing 116 which has axially spaced sheds 119 along the length thereof. Body portion 112 may have annular flange 113 at the end thereof, with sealing means 121, and casing 116 may have flange 117 at one end thereof, with clamping means 115. The upper end of casing 116 may extend and be clamped to connector 111 rather than to rigid body 112. All of the relevant features of the embodiments of FIGS. 3, 5a–5c, and 6 may be applied to the structure of FIG. 7. It will be understood that if insulating body portion 112 has flange 113, the casing 116 is sufficiently elastic so that it can be applied over the flange.

In FIG. 7, it will be understood that where the rigid body has a diameter which is substantially uniform over its length, a casing such as that shown in FIG. 3 is provided, with sheds extending graduated increasing distances from the body of the casing to insure better washoff of contaminant from all the sheds.

It will be understood that the structure of FIG. 7 has the lower end thereof adapted to be mounted on a supporting structure, and has other clamping means, not shown for convenience of illustration, for clamping the lower end of the casing to the rigid member.

It will be further understood that in some embodiments an oil-filled space, sealed by the clamping means, exits between the inside wall of the casing 116 and the wall of the rigid member 112. This oil-filled space may be only great enough in its radial dimension to provide more flexibility and greater response of the sheds to wind to break ice and throw off snow, the casing being very resilient and elastic. In another embodiment, the volume of oil may be quite large, in accordance with the teaching hereinabove with respect to FIGS. 5a–5c.

Butyl rubber is a suitable material for at least some embodiments; its resiliency and elasticity may be varied over wide limits, which may be done by one skilled in the art in accordance with published literature.

In the claims appended hereto, the term "bushing" is employed both as generic to any elongated insulating structure for separating and maintaining separated two conductive surfaces at opposite polarity with respect to each other, as well as in the specific sense of a structure for insulating and/or protecting one or more conductors which pass through it.

I claim as my invention:

1. Bushing apparatus for mounting outdoors where the bushing will be required to operate in an ambient temperature which varies over a wide range comprising, in combination, a rigid bushing body having a conductor stud extending therethrough with at least one end having a portion extending beyond the bushing body, a groundable sleeve of conductive material mounted at a selected axial position on the bushing body, a weather casing having spaced sheds along the length thereof and having at least the body portion thereof composed of resilient and elastic material, the inside surface of the weather casing enclosing a substantial space between it and the adjacent body portion of the bushing, means clamping one end of the weather casing to the conductor stud and other means clamping the other end of the weather casing to the ground sleeve, and a volume of liquid insulating material completely filling said space without leaving any gas therein, said volume being sufficiently great that when inserted in the bushing before sealing the space by one of the clamping means the elastic weather casing undergoes substantial stretching, the weather casing after the liquid insulating material is sealed in the bushing by one of said clamp means undergoing further stretching and expansion as needed to contain an expanded volume of liquid due to a temperature rise therein resulting from at least one of the factors including ambient temperature, heat generated by current flowing in the conductor stud, and heat generated in the dielectric of the bushing, the weather casing contracting when the volume of the liquid insulating material decreases due to a reduction in the temperature thereof and enclosing the volume of liquid without permitting any airspace to form inside the bushing.

2. A bushing according to claim 1 in which the liquid insulating material is oil.

3. A bushing for outdoor use having a rigid bushing body composed of insulating material and of substantially uniform outside diameter along the length thereof, a conductor stud extending through the bushing, a groundable sleeve of conductive material enclosing a selected axial portion of the bushing body and secured to the same, the conductor stud having a threaded end extending beyond an adjacent end of the bushing body, a weather casing composed of resilient and elastic electrical insulating material enclosing substantially that portion of the bushing body which extends from the groundable sleeve to the extended end of the conductor stud, a pair of means securing the weather casing to the groundable sleeve and to the conductor stud, the casing having spaced sheds along the length thereof, and an insulating filler material of substantial volume between the inside wall of the weather casing and the outside wall of the bushing body, the casing being stretched when the filler material is inserted and thereafter sealed within by at least one of the securing means, the stretched weather casing keeping the filling compound under pressure at all times thereby preventing voids which would tend to produce deterioration of the dielectric and radio interference.

4. A bushing according to claim 3 in which the sheds extending from the weather casing increase in outside diameter in graduated steps as their distance from the groundable sleeve becomes less to provide lower sheds which extend out farther from the body of the weather casing than the upper sheds to thereby improve washoff from the lower sheds and tend to maintain the creep resistance across the weather casing between surfaces of opposite polarity at its maximum value.

5. Insulating apparatus for mounting outdoors where the apparatus will be located in an ambient temperature which varies over a wide range comprising, in combination, an elongated rigid member composed of electrically insulating material having connecting means secured to one end thereof and adapted to be mounted at the other end thereof to a supporting structure, a weather casing composed or resilient and elastic electrically insulating material encasing the rigid member, means at each end of the casing clamping the casing to the rigid member, and a substantial volume of oil enclosed in a spaced between the inside wall of the casing and the wall of the rigid member, the elastic casing being stretched to enclose the volume of oil when first inserted in the apparatus and thereafter clamped to form a sealed chamber for the oil, the elastic casing stretching to accommodate an increase in the volume of oil due to an increase in the temperature thereof, the elastic casing shrinking to accommodate a decrease in the volume of oil due to a decrease in the temperature thereof to thereby maintain a space completely filled with oil and having no air pocket therein.

6. A substantially self-cleaning, substantially weatherproof high voltage bushing comprising an elongated body portion having an axial bore therethrough, the elongated body portion being composed of rigid insulating material, a conductor stud extending through said bore, said body portion having an annular groove therearound at a predetermined axial position, a ground flange composed of conductive material having a cylindrical portion extending at least partially into the groove and having an extended flange portion, said ground flange being adapted to be mounted in a position whereby a portion of the bushing on one side of the ground flange is exposed to the weather, the portion of the bushing body within said last-named portion of the bushing tapering from a relatively large diameter near the ground flange to a relatively small diameter at the end of the conductor stud extending from said last-named portion a weather casing of resilient insulating material covering said last-named portion of the bushing body, the casing of resilient insulating material having a portion of reduced diameter at the end thereof adjacent the conductor stud and closely fitting the conductor stud, the potion of the weather casing at the other end thereof adjacent the ground flange extending down over the outside of the adjacent cylindrical portion of the ground flange, clamping means clamping said last-named portion of the weather casing around the ground flange in moistureproof sealing engagement therewith, other clamping means clamping the portion of reduced diameter of the weather casing to the conductor stud in moistureproof sealing engagement therewith, the weather casing having axially spaced sheds normally extending therefrom substantially perpendicular to the longitudinal axis of the bushing and the casing, all said sheds having substantially flat upper and lower surfaces, the sheds extending equal distances from the body of the casing, said tapering portion of the bushing body providing that sheds near the ground flange extend radially beyond sheds near said end of the conductor stud whereby washoff of the sheds near the ground flange is facilitated and more effective self-cleaning is provided, the body portion of the weather casing being so resilient that the sheds are moved from their normal portions by the force of wind thereon, dislodging snow and breaking any ice formed thereon.

7. A weather casing for use on a bushing having an elongated body portion composed of rigid insulating material, a conductor stud extending therethrough, and a ground flange disposed in predetermined axial position along the length of the bushing, the body portion of the bushing on one side of the ground flange tapering from a relatively large outer diameter adjacent the ground flange to a relatively small outer diameter adjacent the end of the conductor stud extending from the bushing on that side of the ground flange, the weather casing being composed of resilient electrical insulating material, the weather casing being of tapering diameter and preformed to be slipped over the end of the conductor stud and onto the bushing body and having a portion of relatively large diameter to extend over at least a portion of the ground flange and adapted to be clamped to the ground flange, the weather casing having a portion of small diameter relative to the first-named portion and shaped to closely fit the end of the conductor stud and adapted to be clamped thereto, the weather casing having a plurality of axially spaced sheds normally extending therefrom substantially perpendicular to the axis of the casing while the casing is mounted on the bushing, all said sheds having substantially flat upper and lower surfaces while the casing is mounted on the bushing, the sheds extending equal distances from the body of the casing, the slope of the outside surface of the weather casing resulting from the tapering diameter thereof causing the sheds thereof near the ground flange to extend radially beyond the sheds thereof near said end of the conductor studs whereby more effective self-cleaning of the casing surface is provided by increasing the washoff of the sheds near the ground flange, the body portion of the weather casing being so resilient that the sheds are moved from their normal positions by the force of wind thereon, dislodging snow and breaking any ice formed thereon.

8. Bushing apparatus for outdoor mounting comprising, in combination, a rigid bushing body having a conductor stud extending therethrough with at least one end having a portion extending beyond the bushing body, a groundable sleeve of conductive material mounted at a selected axial position on the bushing body, a weather casing having at least the body portion thereof composed of resilient, flexible, and elastic material, having axially spaced sheds extending from the body portion along the length thereof and enclosing that portion of the bushing body which extends from the groundable sleeve to the extending portion of the conductor stud, means securing one end of the casing to the groundable sleeve and other means securing the other end of the weather casing at the conductor stud, both securing means providing weatherproof sealing, the material of the body portion of the weather casing being so elastic and flexible that the sheds are moved out of their normal positions by winds thereby breaking ice formed thereon and throwing off snow accumulated thereon, the bushing having an oil-filled space between the inside wall of the body portion of the weather casing and the wall of the rigid bushing body, said oil-filled space extending substantially the length of the weather casing, the fluid oil assisting in making the sheds more responsive to the force of the wind thereon.

9. Bushing apparatus according to claim 8 in which both securing means are clamping means securing the weather casing to the groundable sleeve and to the conductor stud.

10. Bushing apparatus according to claim 8 in which the rigid bushing body has a diameter which tapers from a relatively large value at one end thereof to a relatively small value at the other end thereof remote from the groundable sleeve, and in which the casing has sheds which extend a substantially uniform distance from the body of the casing, the tapered shape of the rigid bushing body insuring that the lower sheds extend in graduated steps beyond a shed immediately thereabove, thereby ensuring that the lower sheds have more rain reach the surfaces thereof to enhance washoff of contaminant.

11. A bushing according to claim 8 in which the rigid bushing body has a diameter which is substantially uniform over the entire length thereof, and in which the sheds on the casing extend graduated increasing distances from the body of the casing as the sheds approach the portion of the rigid bushing body near the groundable sleeve, to thereby enhance washoff of deposited contaminant by rain from all the sheds.